United States Patent
Elko et al.

(10) Patent No.: US 6,490,689 B1
(45) Date of Patent: Dec. 3, 2002

(54) MANAGING INSTRUCTION EXECUTION IN ORDER TO ACCOMMODATE A PHYSICAL CLOCK VALUE IN A CLOCK REPRESENTATION

(75) Inventors: David Arlen Elko, Austin, TX (US); Jeffrey M. Nick, West Park, NY (US); Ronald M. Smith, Sr., Wappingers Falls, NY (US); Charles F. Webb, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/337,157

(22) Filed: Jun. 21, 1999

(51) Int. Cl.$^7$ ................................................. G06F 1/04
(52) U.S. Cl. ........................ 713/500; 713/400; 713/600; 710/61; 712/245
(58) Field of Search ................................. 713/500–503, 713/400, 401, 600; 710/200, 58, 61, 125; 711/130; 709/100; 714/744, 755; 712/245

(56) References Cited

U.S. PATENT DOCUMENTS

| | | | | |
|---|---|---|---|---|
| 4,050,096 A | * | 9/1977 | Bennett et al. | 364/200 |
| 4,841,524 A | * | 6/1989 | Miyaou et al. | 370/112 |
| 5,133,077 A | * | 7/1992 | Karne et al. | 712/1 |
| 5,317,739 A | | 5/1994 | Elko et al. | 395/650 |
| 5,493,668 A | * | 2/1996 | Elko et al. | 711/130 |
| 5,561,809 A | | 10/1996 | Elko et al. | 395/800 |
| 5,706,432 A | | 1/1998 | Elko et al. | 395/200.08 |
| 6,105,098 A | * | 8/2000 | Ninose et al. | 710/200 |
| 6,178,421 B1 | * | 1/2001 | Dahlen et al. | 707/8 |
| 6,230,243 B1 | * | 5/2001 | Elko et al. | 711/130 |
| 6,243,372 B1 | * | 6/2001 | Petch et al. | 370/350 |

OTHER PUBLICATIONS

"Enterprise Systems Architecture/390 Principles of Operation," IBM Publication No. SA22–7201–04, Fifth Edition (Jun. 1997); pps. 4–25–4–32; 4–38; 6–11–6–12; 7–81–7–82; 10–69;11–10; 12–5.

* cited by examiner

Primary Examiner—Jeffrey Gaffin
Assistant Examiner—Rijue Mai
(74) Attorney, Agent, or Firm—Floyd A. Gonzalez, Esq.; Marc A. Ehrlich, Esq.; Heslin Rothernberg Farley & Mesiti P.C.

(57) ABSTRACT

A physical clock is expanded to enhance its precision. Existing instructions are capable of using the enhanced physical clock. Execution of an instruction begins, which places a value of the expanded physical clock in a physical clock field of a clock representation. The physical clock field is, however, unable to accommodate the value provided by the expanded physical clock. Thus, that value encroaches upon another predefined field of the clock representation. Completion of the instruction is therefore delayed such that the value provided by the expanded physical clock can be accommodated in the clock representation and a correct value for the another predefined field can be provided.

20 Claims, 8 Drawing Sheets fig. 1 fig. 2 fig. 3 fig. 4 fig. 5 fig. 6 fig. 7 fig. 8 fig. 9 fig. 10 fig. 11 fig. 12 fig. 13

MANAGING INSTRUCTION EXECUTION IN ORDER TO ACCOMMODATE A PHYSICAL CLOCK VALUE IN A CLOCK REPRESENTATION

CROSS-REFERENCE TO RELATED APPLICATIONS

This application contains subject matter which is related to the subject matter of the following application, which is assigned to the same assignee as this application and filed on the same day as this application. The below listed application is hereby incorporated herein by reference in its entirety:

"METHOD, SYSTEM AND PROGRAM PRODUCTS FOR GENERATING SEQUENCE VALUES THAT ARE UNIQUE ACROSS OPERATING SYSTEM IMAGES," by Elko et al., Ser. No. 09/337,158.

TECHNICAL FIELD

This invention relates, in general, to timing facilities within a computing environment and, in particular, to employing physical clocks that have been expanded to enhance timing precision.

BACKGROUND ART

Typically, processors of a computing environment either include or have access to timing facilities that provide date and time of day information. In the ESA/390 architecture offered by International Business Machines Corporation, the timing facilities include a time-of-day (TOD) clock, which provides a high-resolution measure of real-time suitable for the indication of the date and time.

In one example, the time-of-day clock is represented as a 64-bit-integer value that is set and incremented in an architecturally prescribed fashion based on real-time. This basic TOD clock is set to a value that corresponds to present time in Coordinated Universal Time (UTC), where bit 51 is updated once per microsecond and a clock value of zero corresponds to Jan. 1, 1900, 0 a.m.

The TOD-clock facility of ESA/390 is based on various architectural requirements, which are summarized below:

1. Uniqueness: Two executions of a STORE CLOCK instruction (used by a program to obtain the date and/or time), possibly on different central processing units (CPUs), are to store different values. Programs are to be able to rely on this uniqueness rule to produce unique identifiers for new object instances.
2. Monotonicity: The values stored by two STORE CLOCK instructions correctly imply the sequence of execution of the two instructions; namely, the instruction that occurs later in time stores a larger time value. This is true whether the two instructions are executed on the same or different CPUs. Programs are to be able to rely on this monotonicity rule to determine the sequence of occurrence of distinct events.
3. Predictable resolution: The resolution of the TOD clock is such that the incrementing rate is comparable to the instruction execution rate of the machine and should advance at least once during a time equal to, for instance, 10 average instructions. Performance characteristics of program loops can be determined by comparing time values at the beginning and end of the program. A predictable resolution allows these performance algorithms to be independent of the processor speeds.

Although efforts have been made to meet the above requirements, technological enhancements in processors have and continue to place strain on the ability to meet those requirements, as well as other requirements or features. Thus, enhanced timing facilities are needed to better meet the current requirements, as well as the requirements or desires of the future. For example, enhanced timing facilities are needed that employ expanded physical clocks, which are faster and continue to meet the uniqueness requirement.

SUMMARY OF THE INVENTION

The shortcomings of the prior art are overcome and additional advantages are provided through the provision of a method of employing expanded physical clocks. The method includes, for instance, beginning execution of an instruction that places a value of a physical clock in a physical clock field of a clock representation, the physical clock field being unable to accommodate the value provided by the physical clock, and wherein the value encroaches upon at least a portion of another predefined field of the clock representation; and delaying completion of the instruction, wherein the value is accommodated in the clock representation and a correct value is provided for the another predefined field.

In one embodiment of the invention, the delaying includes delaying completion of the instruction until at least a portion of the value encroaching upon the another predefined field includes a correct value for an encroached portion of the another predefined field.

In another aspect of the present invention, a method of employing enhanced physical clocks is provided. The method includes, for example, expanding a physical clock to provide enhanced precision of the physical clock; and delaying completion of an instruction that uses the physical clock to preserve behavior of the instruction even though the physical clock has expanded.

In yet another aspect of the present invention, a system of employing expanded physical clock is provided. The system includes, for instance, means for beginning execution of an instruction that places a value of a physical clock in a physical clock field of a clock representation, the physical clock field being unable to accommodate the value provided by the physical clock, wherein the value encroaches upon at least a portion of another predefined field of the clock representation; and means for delaying completion of the instruction, wherein the value is accommodated in the clock representation and a correct value is provided for the another predefined field.

In another aspect of the present invention, a system of employing enhanced physical clocks is provided. The system includes, for example, means for expanding a physical clock to provide enhanced precision of the physical clock; and means for delaying completion of an instruction that uses the physical clock to preserve behavior of the instruction even though the physical clock has expanded.

In a further aspect of the present invention, a system of employing expanded physical clocks is provided. The system includes, for instance, a processor adapted to begin execution of an instruction that places a value of a physical clock in a physical clock field of a clock representation, the physical clock field being unable to accommodate the value provided by the physical clock, wherein the value encroaches upon at least a portion of another predefined field of the clock representation; and the processor being further adapted to delay completion of the instruction, wherein the value is accommodated in the clock representation and a correct value is provided for the another predefined field.

In another aspect of the present invention, an article of manufacture including at least one computer usable medium having computer readable program code means embodied therein for causing the employing of expanded physical clocks is provided. The computer readable program code means in the article of manufacture, includes, for instance, computer readable program code means for causing a computer to begin execution of an instruction that places a value of a physical clock in a physical clock field of a clock representation, the physical clock field being unable to accommodate the value provided by the physical clock, wherein the value encroaches upon at least a portion of another predefined field of the clock representation; and computer readable program code means for causing a computer to delay completion of the instruction, wherein the value is accommodated in the clock representation and a correct value is provided for the another predefined field.

In yet another aspect of the present invention, at least one program storage device readable by a machine, tangibly embodying at least one program of instructions executable by the machine to perform a method of employing enhanced physical clocks is provided. The method includes, for instance, expanding a physical clock to provide enhanced precision of the physical clock; and delaying completion of an instruction that uses the physical clock to preserve behavior of the instruction even though the physical clock has expanded.

Advantageously, the present invention provides a mechanism for employing expanded physical clocks. An instruction, which has not been updated for the expansion, can nevertheless use an expanded clock. In particular, the instruction is delayed in orders accommodate the expanded clock.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with the principles of the present invention, timing facilities are provided that enhance the ability to provide faster physical clocks, to provide unique clock values for multiple operating system images and to provide an ever-increasing sequence of numbers for the clock values.

The enhanced timing facilities include, for instance, an extended time-of-day clock representation, a programmable register and new instructions, which are described below.

The timing facilities of the present invention are included in, for example, a computing unit 100 (FIG. 1) based on the Enterprise Systems Architecture (ESA)/390 offered by International Business Machines Corporation, Armonk, N.Y. ESA/390 is described in an IBM Publication entitled "Enterprise Systems Architecture/390 Principles of Operation," IBM Publication No. SA22-7201-04, June 1997, which is hereby incorporated herein by reference in its entirety. In one embodiment, computing unit 100 is an ES/9000 computer, which includes at least one central processing unit 102, a main storage 104 and one or more input/output devices 106.

Figure 1:
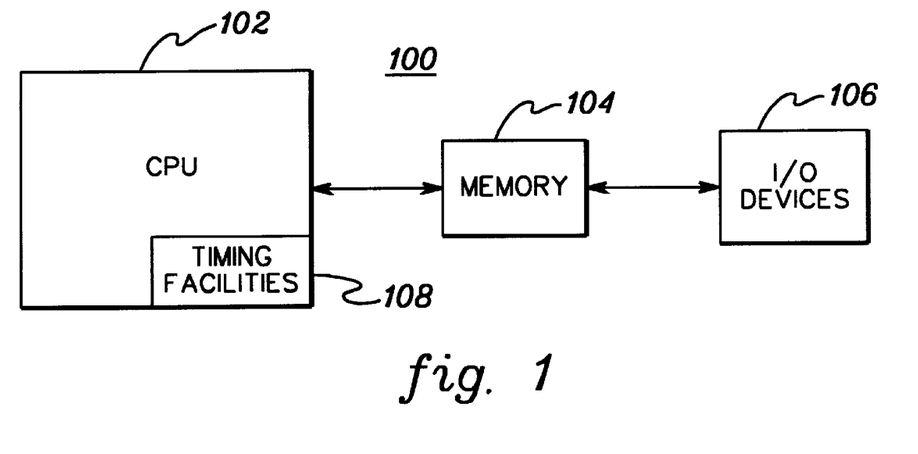
FIG. 1 depicts one example of a computing environment incorporating and using the timing facilities of the present invention.

As one example, each central processing unit 102 includes timing facilities 108. However, in another embodiment, each central processing unit (or a subset thereof) is coupled to the timing facilities, which are located in a shared component, such as a shared memory bus.

Computing unit 100 may be a stand-alone computer or it may be included in a larger computing environment, such as, for example, a Symmetrical Multiprocessor (SMP) environment or a Sysplex environment offered by International Business Machines Corporation.

Figure 2:
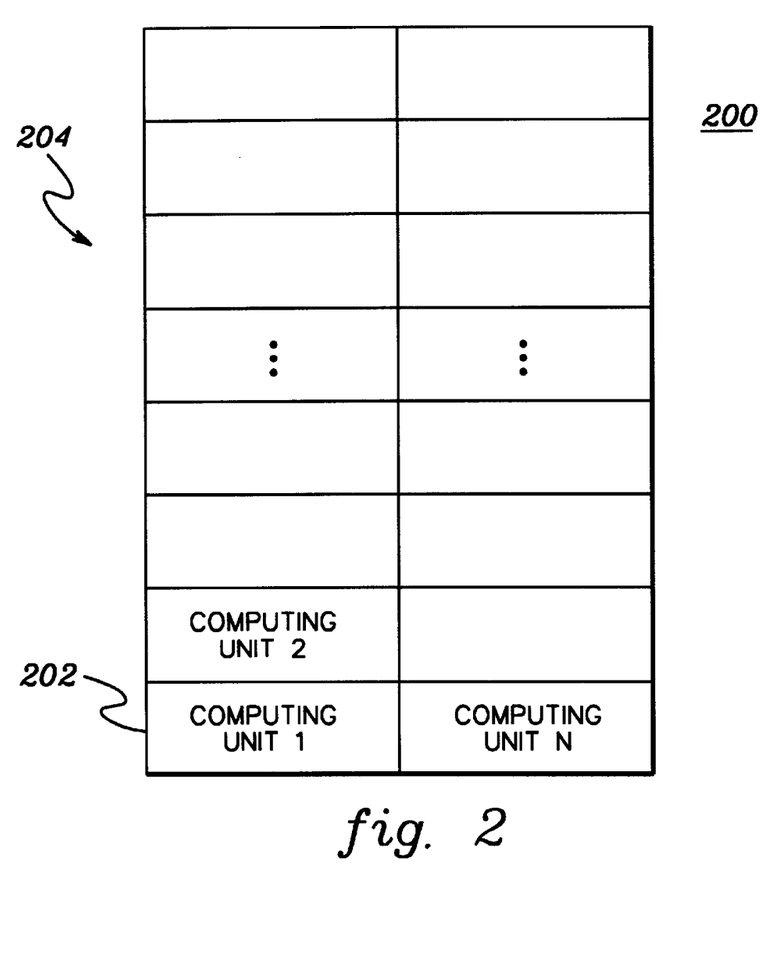
FIG. 2 is one example of a Symmetrical Multiprocessor (SMP) environment incorporating and using the timing facilities of the present invention.

One example of an SMP environment is depicted in FIG. 2. SMP environment 200 includes a plurality of computing units 202 coupled to one another via, for example, a switch. The plurality of computing units are packaged in a frame 204, which includes, for instance, up to 16 computing units. In an SMP environment, all of the computing units share one operating system image. SMP is further described in "Enterprise Systems Architecture (ESA)/390 Principles Of Operation," IBM. Publication No. SA22-7201-04, June 1997, which is hereby incorporated herein by reference in its entirety.

Figure 3:
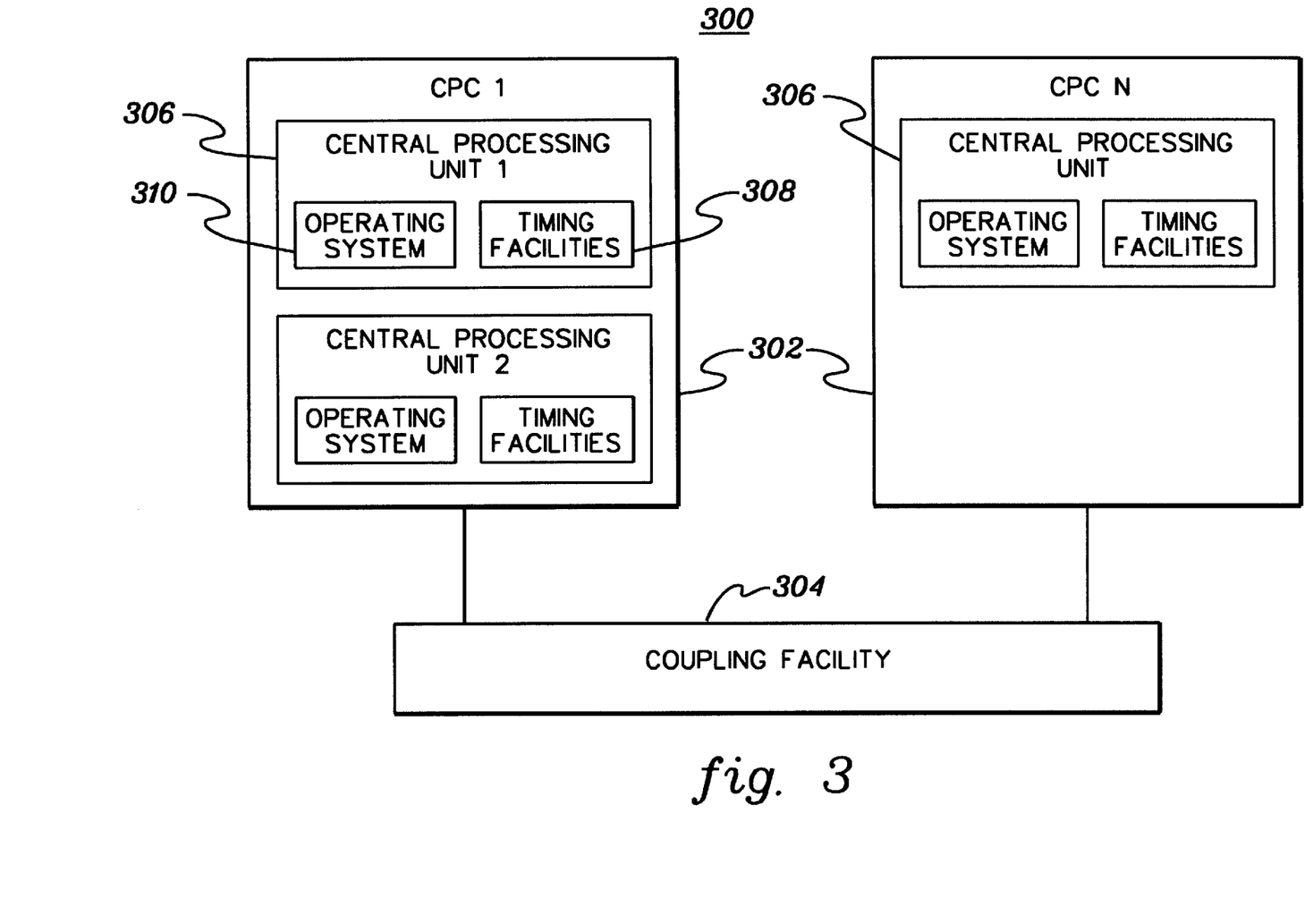
FIG. 3 is one example of a Sysplex environment incorporating and using the timing facilities of the present invention.

One embodiment of a Sysplex environment is described with reference to FIG. 3. A Sysplex environment 300 includes, for instance, one or more central processing complexes (CPCs) 302 coupled to at least one coupling facility 304.

Each central processing complex includes, for example, at least one central processing unit 306. Each central processing unit includes timing facilities 308 and executes an operating system 310, such as the Multiple Virtual Storage (MVS) or OS/390 operating system offered by International Business Machines Corporation. As one example, the same operating system image is executed by each central processing unit of CPC 1, while a different operating system image is executing on CPC 2 (e.g., OS/390 image A is executing on CPC 1 and OS/390 image B is executing on CPC 2; or OS/390 image A and another compatible operating system).

In another example, the operating system image executing on CPU 1 of CPC 1 is different from the operating system image executing on CPU 2 of CPC 1.

Each central processing complex 302 is coupled to coupling facility 304 (a.k.a., a structured external storage (SES) processor). Coupling facility 304 contains storage accessible by the central processing complexes and performs operations requested by programs in the CPCs. Aspects of the operation of a coupling facility are described in detail in such references as Elko et al., U.S. Pat. No. 5,317,739, entitled "Method And Apparatus For Coupling Data Processing Systems", issued May 31, 1994; Elko et al., U.S. Pat. No. 5,561,809, entitled "In a Multiprocessing System Having A Coupling Facility, Communicating Messages Between The Processors And The Coupling Facility In Either A Synchronous Operation or an Asynchronous Operation", issued on Oct. 1, 1996; Elko et al., U.S. Pat. No. 5,706,432, entitled "Mechanism For Receiving Messages At A Coupling Facility", issued Jan. 6, 1998, and the patents and applications referred to therein, all of which are hereby incorporated herein by reference in their entirety.

Although various computing environments are described above, those environments are only put forth as examples. The capabilities of the present invention can be used with other computing units, computing systems and or computing environments, without departing from the spirit of the present invention.

In one embodiment, the timing facilities of the present invention include a representation of an extended time-of-day (TOD) clock. One example of such a representation is described with reference to FIG. 4. An extended time-of-day clock representation 400 is, for instance, a 128-bit integer value that contains, for example, four components: a time-of-day epoch index (TEX) field 402, which is included in bits 0–7 of the extended time-of-day clock representation; a physical TOD clock field 404, which is included in bits 8 to s+8 and is referred to as the basic time-of-day clock; a processor identifier field 406, which is located in bits 104–111 of the extended time-of-day clock representation; and a TOD programmable field (TODPF) 408, which is contained in bits 112–127. Each of these fields is further described below.

Figure 4:
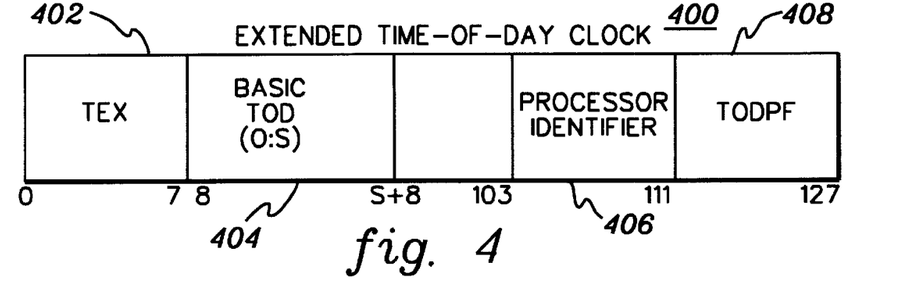
FIG. 4 depicts one example of a representation of an extended time-of-day clock, in accordance with the principles of the present invention.

TOD epoch index field (TEX) 402 is a one byte value, which is stored with a value of 0, at this time. This field is usable for further extensions of the time-of-day clock. For example, the bits of this field will be used to extend the physical TOD clock past Sep. 17, 2042 at 11:54 pm.

In particular, since one embodiment of the basic TOD clock (i.e., the physical clock or clock register) is established on an absolute time base, zero corresponds to Jan. 1, 1900 and bit 51 is defined as a microsecond increment. Thus, the basic clock will wrap back to zero at a prescribed time in the future (i.e., Sep. 17, 2042 at 11:54 pm.). Up until that point in time, the clock values represent an increasing sequence of numbers; a characteristic on which programs written to use the TOD clock rely.

In accordance with the principles of the present invention, the TOD epoch index adds, for example, eight additional bits to the left of bit 0 of the basic TOD clock value. Thus, values beyond 2043 will be handled by nonzero TEX values which will handle carries out of the basic TOD clock. This delays the wrapping problem for 36,534 years.

Programs that will continue to run on machines that support time values beyond the standard epoch will be written to allow for nonzero TEX values.

The TOD Epoch Index is, at this time, stored as zero in ESA/390 machines. However, future models will need to support time values that exceed the end of the standard epoch, which will occur in the year 2042. Testing requirements and machine longevity dictate that such '2042-capable' machines should be made available. The timing facility architecture for these machines are to be extended to support a nonzero TOD Epoch Index. This includes the capability to propagate carries from bit 8 to the extended form and to set the TOD-epoch index to any value when the clock is set.

The use of the TOD epoch index ensures that each value (e.g., the 128 bits) resulting from the extended time-of-day clock representation is in increasing sequence order, even when the physical clock that provides the value for basic TOD field 404 wraps back to zero.

Basic TOD clock 404 is a representation of the physical clock used by the programs to obtain timing information (e.g., date information and/or time-of-day information). The physical clock is the running clock that is incremented on a predefined basis. The basic time-of-day clock representation is further described in "Enterprise Systems Architecture/390 Principles of Operation," IBM Publication No. SA22-7201-04, June 1997, which is hereby incorporated herein by reference in its entirety.

Figure 5:
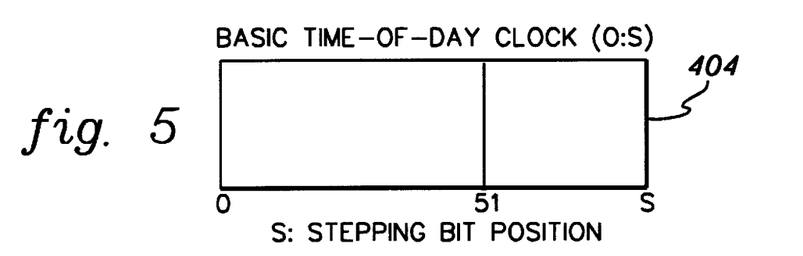
FIG. 5 depicts one embodiment of a representation of a basic time-of-day clock used in accordance with the principles of the present invention.

TOD clock 404 is also further described in more detail with reference to FIG. 5. In particular, bits 0-s of the representation of the basic time-of-day clock are shown in FIG. 5. In the basic form, the physical TOD clock is incremented by adding a 1 in bit position 51 every microsecond. In models having a higher or lower resolution, a different bit position, called the stepping bit(s) is incremented at such a frequency that the rate of advancing the clock is the same as if a 1 were added in bit position 51 in the basic form every microsecond. The stepping bit is the rightmost bit in the TOD clock that is incremented, and the frequency with which the stepping bit is incremented is called the incrementing rate.

Stepping bit 's' in the basic form corresponds to stepping bit 's+8' in the extended form (see FIG. 4), provided the bit position, s+8, is less than or equal to bit position 71 in the extended form. In this case, the resolution of the two forms of the clock are the same and bits 0 to s of the basic form and bits 8 to s+8 of the extended form are synchronized. If the stepping bit position s+8 corresponds to a bit to the right of bit 71 in the extended form, then the resolutions of the two forms differ. In this case, the stepping bit for the basic form is bit 63, which increments approximately once each 244 picoseconds, and bits 0 to 63 of the basic form and bits 8 to 71 of the extended form are synchronized. The resolution of the TOD clock is such that the incrementing rate is comparable to the instruction-execution rate of the model.

A TOD clock is said to be in a particular multiprocessing configuration if at least one of the CPUs which shares that clock is in the configuration. Conversely, if all CPUs having access to a particular TOD clock have been removed from a particular configuration, then the TOD clock is no longer considered to be in that configuration.

When more than one TOD clock exists in the configuration, the stepping rates are synchronized such that all TOD clocks in the configuration are incremented at the same rate.

When incrementing of the clock causes a carry to be propagated out of bit position 0 in the basic form, the carry is ignored, and counting continues from zero. In the extended form in which there is a placeholder, future models may support a carry provided by an extended physical clock.

Returning to FIG. 4, extended time-of-day clock representation 400 also includes processor identifier field 406. Processor identifier field 406 includes, for instance, the address of the processor executing a STORE CLOCK or STORE CLOCK EXTENDED instruction (described below) to obtain the timing information. This field is used to ensure the value obtained from the representation is unique across processors, which use a single operating system image. (In another embodiment, an identifier other than an address may be used.)

TOD Programmable Field (TODPF) 408 is, for instance, a 16-bit quantity that can be used for various purposes, including to provide system identifying information (e.g., an operating system identifier). This allows the uniqueness of the TOD clock values resulting from representation 400 to be extended to, for instance, different operating system images in a Sysplex environment.

TOD programmable field 408 corresponds to a time-of-day programmable field 602 (FIG. 6) of a TOD programmable register 600. In register 600, the TOD programmable field is, for instance, a 16-bit quantity contained in bit positions 16–31 of the TOD programmable register. Bits 0–15 of the register currently contain zeros and can be used for further expansion.

Figure 6:
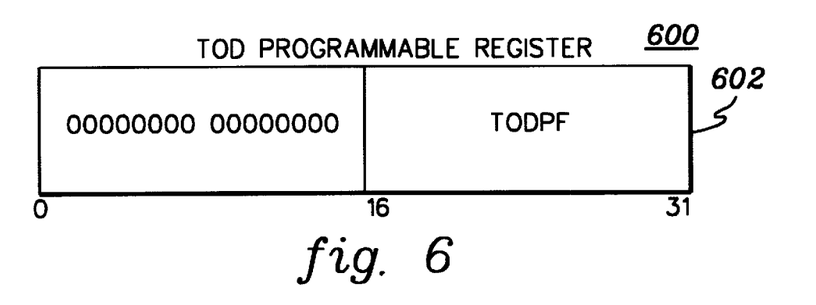
FIG. 6 depicts one embodiment of a time-of-day programmable register used in accordance with the principles of the present invention.

In one embodiment, a TOD programmable register exists for each CPU of the system and the contents of the TOD programmable register can be set by a privileged instruction, referred to as a SET CLOCK PROGRAMMABLE FIELD (SCKPF) instruction. This instruction is independent of an instruction used to initialize the physical clock (e.g., SET CLOCK), and thus, can be executed at a time apart from when the clock is initialized. The contents of the register are reset to a value of all zeros by an initial CPU reset.

Figure 7:
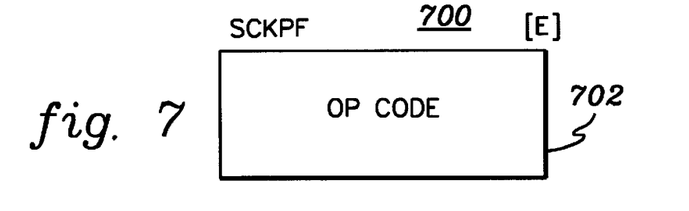
FIG. 7 depicts one example of a SET CLOCK PROGRAMMABLE FIELD instruction used in accordance with the principles of the present invention.

As one example, a SET CLOCK PROGRAMMABLE FIELD instruction 700 (FIG. 7) has an "E" format denoting that the operation uses implied operands and that it has an extended op-code field 702, which identifies the operation to be performed. With this instruction, bits 16–31 of a general register (e.g., general register 0) are stored into the corresponding bit positions of TOD programmable register 600. Thus, when this instruction is executed, the identifier located in the general register is stored in the programmable register.

When there are multiple TOD programmable registers (e.g., in an SMP or a Sysplex where there is one register for each CPU), procedures are used to coordinate the values set in the registers. For each operating system image, the id of the image is obtained when the image first joins, e.g., a Sysplex. For each processor used to execute the image, the id is placed in its respective register.

The contents of register 600 and in particular, the contents of TODPF 602 of register 600, are stored within TOD programmable field 408 of the extended form TOD clock using, for instance, a STORE CLOCK EXTENDED instruction.

Figure 8:
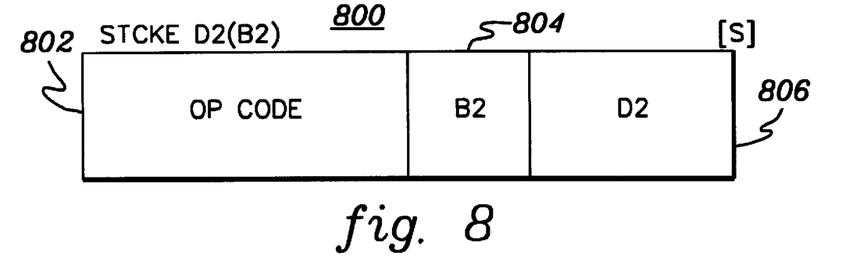
FIG. 8 depicts one examples of a STORE CLOCK EXTENDED instruction used in accordance with the principles of the present invention.

One example of a STORE CLOCK EXTENDED (STCKE) instruction 800 is described with reference to FIG. 8. STCKE instruction 800 has, for instance, an "S" format denoting an operation using an implied operand and storage. Instruction 800 includes an op code 802 specifying the operation to be performed and two storage operand fields 804, 806 to be used to determine the address in which the value of the extended TOD clock representation is to be stored once it is constructed. (As is known, B2 is a base register and D2 is the displacement to be added to the contents of B2 to form a second-operand address.)

The STORE CLOCK EXTENDED instruction provides unique sequence values from the extended TOD clock representation without requiring communication between different operating system images. Thus, the instruction is independent of such communication. One embodiment of the logic associated with executing the STORE CLOCK EXTENDED instruction is described with reference to FIG. 9.

Figure 9:
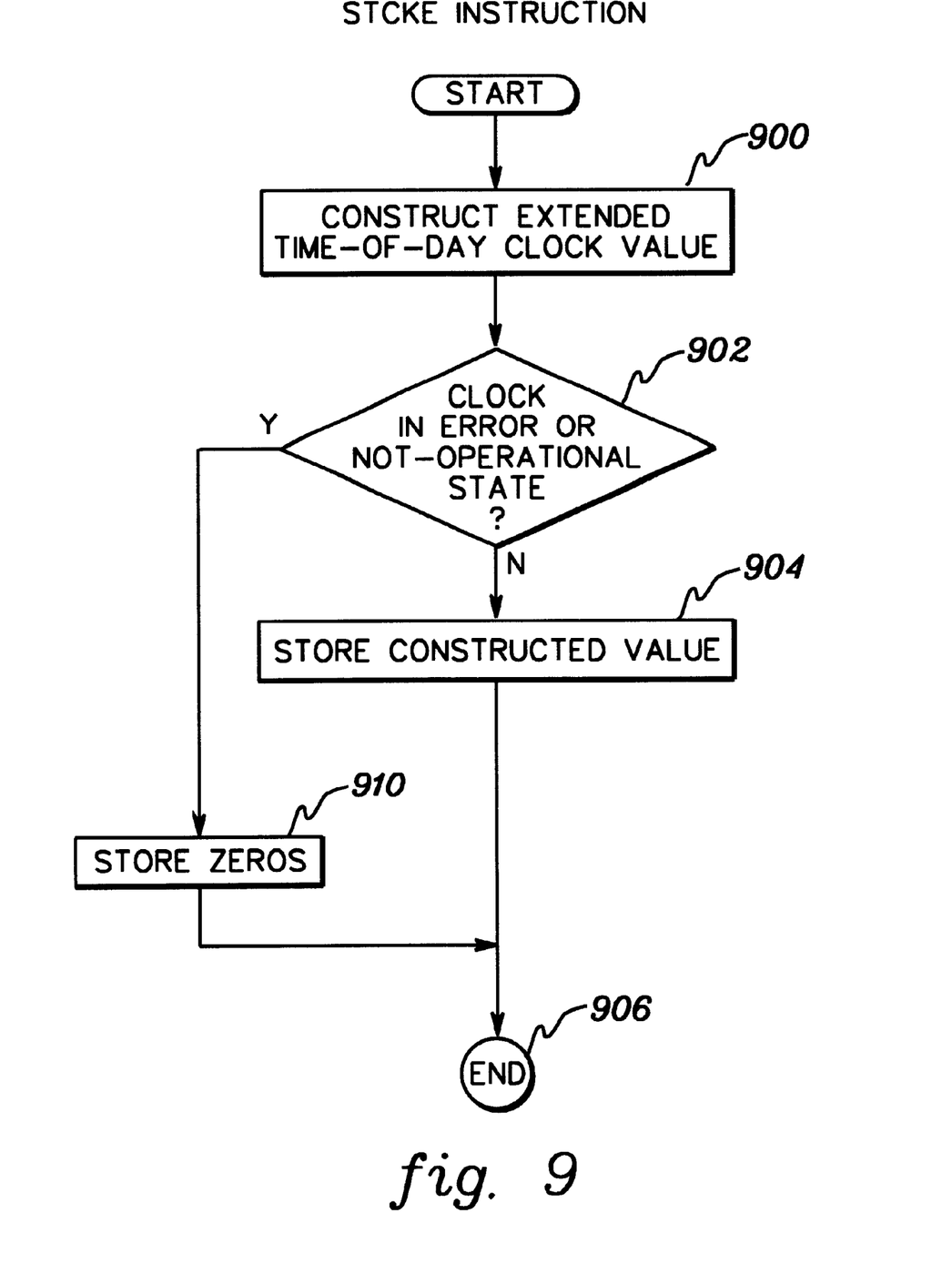
FIG. 9 depicts one embodiment of the logic associated with the STORE CLOCK EXTENDED instruction of FIG. 8, in accordance with the principles of the present invention.

Initially, when the STORE CLOCK EXTENDED instruction is executed by a program wishing to obtain the date and/or time of day, an extended time of day clock value is constructed by filling in representation 400, STEP 900. In one embodiment, the value is constructed, as described below with reference to FIG. 10.

Figure 10:
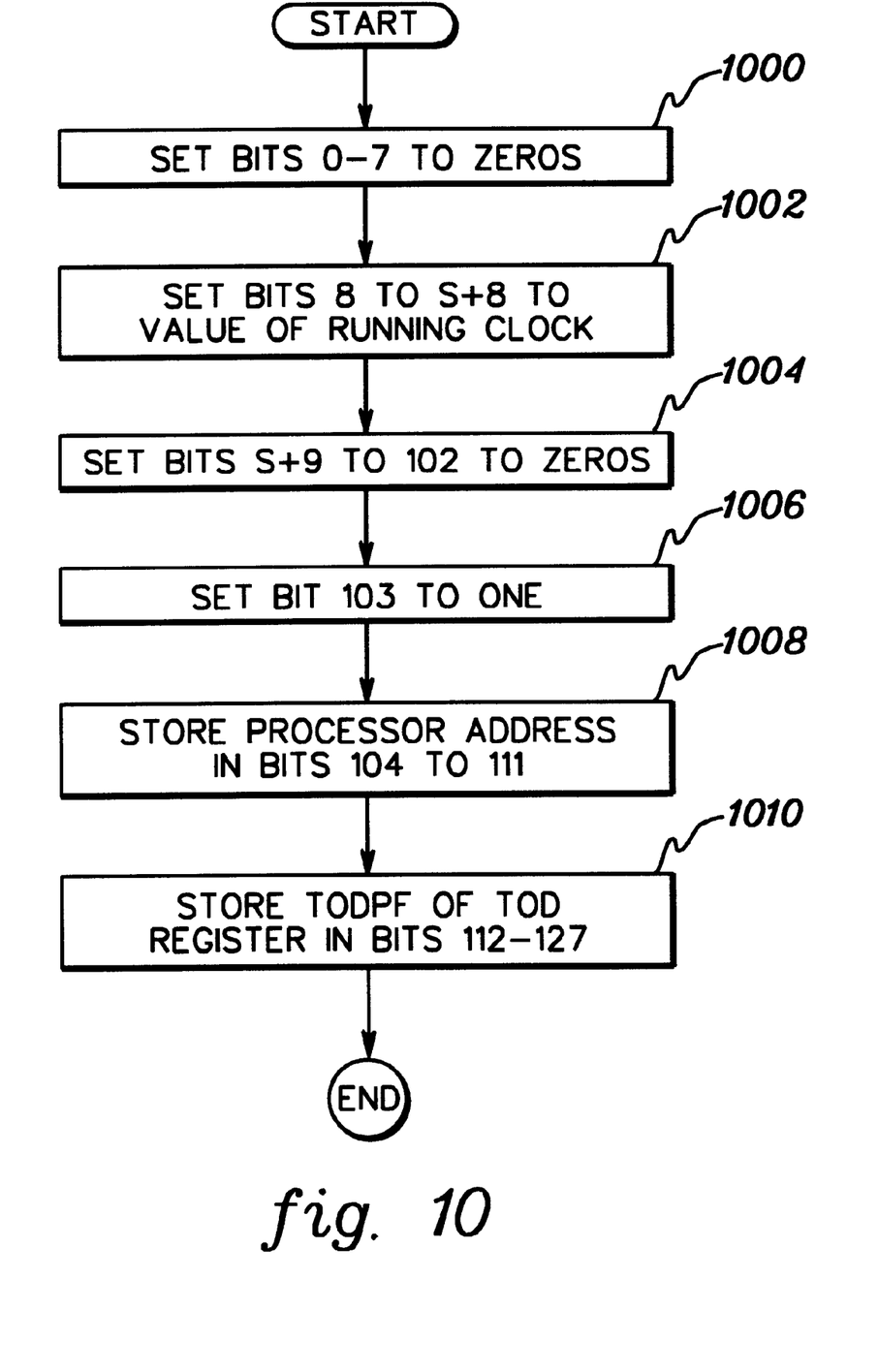
FIG. 10 depicts one embodiment of the logic associated with constructing an extended time-of-day clock value, in accordance with the principles of the present invention.

In particular, bits 0–7 (i.e., the TEX) are set to zeros, STEP 1000. Further, bits 8 to s+8 are set to the value of the running physical clock, STEP 1002. In one example, the running clock is located in the CPU. In other embodiments, it is located elsewhere, such as within a shared memory bus.

Additionally, bits s+9 to 102 are set to zeros, STEP 1004, and bit 103 is set to one, STEP 1006. The setting of bit 103 to one ensures that the extended form time-of-day values are unique when compared with the basic form time-of-day values extended with zeros.

Further, the processor address (or another identifier) of the processor executing the instruction is placed in bits 104 to 111 of the extended time-of-day clock representation, STEP 1008. Additionally, the TODPF field of the TOD register is read and stored into bits 112–127 of the clock representation, STEP 1010.

Returning to FIG. 9, after constructing the extended time-of-day clock value, a determination is made as to which state the physical clock is in, INQUIRY 902. The clock may be in one of various states, including, for instance, stopped, set, not-set, error, and not-operational. The state determines the condition code set by execution of the STORE CLOCK instruction (used for basic TOD clocks) and the STORE CLOCK EXTENDED instruction (used for extended TOD clocks). Each of the states is described further below. The states are described with reference to the ESA/390 architecture.

Stopped State

The clock enters the stopped state when a SET CLOCK instruction is executed on a CPU accessing that clock and the clock is set. This occurs when SET CLOCK is executed without encountering any exceptions, and either (a) any manual TOD-clock control in the configuration is set to the enable-set position, or (b) the TOD-clock-control-override facility is installed and bit 10 of control register 14 is set to one. The clock can be placed in the stopped state from the set, not-set, and error state. The clock is not incremented while in the stopped state.

When the clock is in the stopped state, execution of the STORE CLOCK instruction or STORE CLOCK EXTENDED instruction on a CPU accessing that clock causes condition code 3 to be set and the value of the stopped clock to be stored.

One example of a SET CLOCK instruction is described in "Enterprise Systems Architecture/390 Principles of Operation", IBM Pub. No. SA22-7201-04, June 1997, which is hereby incorporated herein by reference in its entirety.

Set State

The clock enters the set state from the stopped state. The change of state is under control of a TOD-clock sync control bit, bit 2 of control register 0, in the CPU which most recently caused that clock to enter the stopped state. If the bit is zero, the clock enters the set state at the completion of execution of SET CLOCK. If the bit is one, the clock remains in the stopped state until (a) the bit is set to zero on that CPU; (b) another CPU executes a SET CLOCK instruction affecting the clock; (c) any other clock in the configuration is incremented to a value of all zeros in bit positions 32 through the rightmost bit position that is incremented when the clock is running or (d) with an external time reference (ETR), a signal from the ETR is used to set the set state. If any clock is set to a value of all zeros in bit positions 32 through the stepping bit and enters the set state as the result of a signal from another clock, or the ETR, the updating of bit positions 32 through the stepping bit of the two clocks is in synchronism.

Incrementing of the clock begins with the first stepping pulse after the clock enters the set state.

When the clock is in the set state, execution of the STORE CLOCK instruction or STORE CLOCK EXTENDED instruction causes condition code 0 to be set and the current value o f the running clock to be stored.

Not-Set State

The clock is incremented, and is considered running, when it is in either the set state or the not-set state. When the power for the clock is turned on, the clock is set to zero, and the clock enters the not-set state. The clock is incremented when in the not-set state.

When the clock is in the not-set state, execution of the STORE CLOCK instruction or STORE CLOCK EXTENDED instruction causes condition code 1 to be set and the current value of the running clock to be stored.

Error State

The clock enters the error state when a malfunction is detected that is likely to have affected the validity of the clock value. A timing-facility-damage machine-check-interruption condition is generated on each CPU which has access to that clock whenever it enters the error state.

When STORE CLOCK or STORE CLOCK EXTENDED is executed and the clock accessed is in the error state, condition code 2 is set, and the value stored is zero.

Not-Operational State

The clock is in the not-operational state when its power is off or when it is disabled for maintenance. It depends on the model, if the clock can be placed in this state. Whenever the clock enters the not-operational state, a timing-facility-damage machine-check-interruption condition is generated on each CPU that has access to that clock.

When the clock is in the not-operational state, execution of STORE CLOCK or STORE CLOCK EXTENDED causes condition code 3 to be set, and zero is stored.

Continuing with FIG. 9, when the clock is in a set, stopped or not-set state, INQUIRY 902, the value constructed in STEP 900 is stored in the address designated by the second operand address so that the value is available to the program issuing the instruction, STEP 904. Thereafter, the STORE CLOCK EXTENDED instruction is complete, STEP 906.

Returning to INQUIRY 902, if the clock is not in the set, stopped or not-set state, but is in an error or not-operational state, then zeros are stored at the second operand address, STEP 910, and the instruction is complete, STEP 906.

(In another embodiment, the state of the clock is checked prior to constructing the extended time-of-day value such that the value is not constructed, when the clock is in the error or not-operational state.)

A serialization function is performed before the value of the clock is fetched and again after the value is placed in storage.

The quality of the clock value stored by the instruction is indicated by the resultant condition-code setting.

Resulting Condition Code:

0 Clock in set state

1 Clock in not-set state

2 Clock in error state

3 Clock in stopped state or not-operational state.

Condition code 0 normally indicates that the clock has been set by the control program. Accordingly, the value may be used in elapsed-time measurements and as a valid time-of-day and calendar indication. Condition code 1 indicates that the clock value is the elapsed time since the power for the clock was turned on. In this case, the value may be used in elapsed-time measurements, but is not a valid time-of-day indication. Condition codes 2 and 3 mean that the value provided by STORE CLOCK EXTENDED cannot be used for time measurement or indication.

Condition code 3 indicates that the clock is in either the stopped state or the not-operational state. These two states can normally be distinguished because the all-zero value is stored when the clock is in the not-operational state.

The physical clock can be set to a specific value by execution of SET CLOCK, if a manual TOD-clock control of any CPU in the configuration is in the enable-set position. Setting the clock replaces the values in the bit positions of the basic form from bit position 0 through the stepping bit when the clock is running (see FIG. 5). However, on some models, the rightmost bits starting at or to the right of bit 52 of the specified value are ignored, and zeros are placed in the corresponding positions of the clock. Zeros are also placed in positions to the right of bit position 63 of the clock.

The TOD clock can be inspected by executing STORE CLOCK, which causes a 64-bit value to be stored, or by executing STORE CLOCK EXTENDED, which causes a 128-bit value to be stored. Two executions of STORE CLOCK or STORE CLOCK EXTENDED possibly on different CPUs in the same configuration, store different values if the clock is running or, if separate clocks are accessed, both clocks are running and are synchronized.

The values stored for a running clock correctly imply the sequence of execution of any combination of STORE CLOCK and STORE CLOCK EXTENDED on one or more processors in the same configuration for all cases where the sequence can be established by means of the program. To ensure that unique values are obtained when the value of a running clock is stored, nonzero values may be stored in positions to the right of the stepping bit. When the value of a running clock is stored by means of STORE CLOCK EXTENDED, the value in bit positions 72–127 is nonzero. This ensures that the extended-form-TOD values are unique when compared with basic-form-TOD values extended with zeros.

For the purposes of uniqueness and sequence of execution between the results of STORE CLOCK and STORE CLOCK EXTENDED, the 64-bit value provided by STORE CLOCK may be considered to be extended to 128 bits by appending eight zeros on the left and 56 zeros on the right, then treating both values as 128-bit unsigned binary integers.

In a configuration where more than one CPU accesses the same clock, SET CLOCK is interlocked such that the entire contents appear to be updated concurrently; that is, if SET CLOCK instructions are executed simultaneously by two CPUs, the final result is either one or the other value. If SET CLOCK is executed on one CPU and STORE CLOCK or STORE CLOCK EXTENDED on the other, the result obtained by STORE CLOCK or STORE CLOCK EXTENDED is either the entire old value or the entire new value. When SET CLOCK is executed by one CPU, a STORE CLOCK or STORE CLOCK EXTENDED executed on another CPU may find the clock in the stopped state even when the TOD-clock-sync-control bit is zero in each CPU. (The TOD-clock-sync-control bit is bit 2 of control register 0.) Since the clock enters the set state before incrementing, the first STORE CLOCK or STORE CLOCK EXTENDED executed after the clock enters the set state may still find the original value introduced by SET CLOCK.

In accordance with the principles of the present invention, the uniqueness of the extended-form TOD clock value can be extended to separate processors in a multi-system installation by setting the TOD programmable field to a system-unique value on each processor in the configuration.

The uniqueness of the clock value on a single processor is ensured either by making the resolution of the clock sufficiently high in relation to the execution time of STORE CLOCK and STORE CLOCK EXTENDED or by interlocking the storing of the clock value such that execution of STORE CLOCK and STORE CLOCK EXTENDED are delayed until the clock has been incremented since the last execution of the instruction.

The uniqueness of the clock value on separate processors in the same configuration is ensured by placing a processor unique value in the rightmost bits of the clock. In previous models, this is accomplished by placing a four-bit processor address (PA) in bits 60–63 of the basic form TOD value. When the extended TOD clock facility is installed, the PA field should be placed to the right of bit 63, preferably in bits 108–111 of the extended form TOD value.

The uniqueness of the clock value between separate executions of STORE CLOCK and STORE CLOCK EXTENDED can be accomplished by selecting a bit in the range of bits 71 to 107 that is to the right of the stepping bit and setting the bit to one when the extended form is stored. This ensures that when zeros are appended to the basic form for the purposes of comparing with the extended form, the two resulting 128-bit integers are different. The recommended bit is bit 103. This is sufficiently far to right of the stepping bit that it should not need to be changed and it allows expansion of the PA field to the left by 4 bits, which would support 256 processors.

Correct sequencing of STORE CLOCK and STORE CLOCK EXTENDED can be accomplished on future machines by, for instance, delaying the execution of STORE CLOCK until bits 68–71 of the extended form TOD clock match the processor address on this CPU, followed by enough additional delay before storing to ensure that bits 8–71 of the extended form TOD clock value, as observed by all other CPUs in the configuration, is larger than the STORE CLOCK value stored by this CPU.

Advantageously, the extended TOD-clock facility of the present invention addresses various problems of the basic TOD clock by adding two new objects in. the timing facilities: an extended form TOD clock and a TOD programmable register. Specifically, the various problems are addressed as follows:

1. Wrapping of the clock: Since the basic TOD clock is established on an absolute time base, zero corresponds to Jan. 1, 1900 and bit 51 is defined as a microsecond increment. Thus, the clock will wrap back to zero at a prescribed time in the future, i.e., Sep. 17, 2042 at 11:54 pm. Up until that point in time, the basic clock values represent an increasing sequence of numbers, a characteristic on which programs written to use the TOD clock rely.

The extended TOD clock includes the TOD. Epoch Index, which adds eight additional bits to the left of bit 0 of the basic S/390 TOD clock value. Thus, time values beyond 2042 are handled by nonzero TEX values, which handles carries out of the basic TOD. The existence of the TEX field delays the wrapping problem for 36,534 years. This design provides a smooth transition, creating a structure to support the additional 8 high-order bits, while not requiring that they be physically implemented immediately.

The TOD Epoch index is a placeholder that ensures that the values resulting from the extended TOD clock representation are increasing sequence values, even when the physical clock wraps back to zero.

2. Precision limits: In the basic TOD clock, the right-most bit available for the stepping bit is bit 59, which corresponds with a clock precision of between 3 and 4 nanoseconds. Machine cycle times are already being pushed below this level, and in a very few machine generations, this limitation will affect the ability of the machine to implement a sufficiently fast physical clock that can also satisfy the uniqueness requirements.

The extended TOD clock moves the processor identifier past bit 104, allowing the precision of the physical clock to move an additional 36 bits to the right.

Additionally, in accordance with the principles of the present invention, the basic STORE CLOCK instruction can continue to be used, even after the precision of the physical clock is enhanced by adding one or more bits to the clock. In particular, the execution of the STORE CLOCK instruction is slowed down, so that clock values reflect the same bit settings on bits 60–63 on a given processor. That is, the STORE CLOCK instruction begins executing and places a value of the physical clock in the basic TOD clock field of a time-of-day clock representation. Since the time-of-day clock representation has not been expanded, the basic time-of-day clock field is unable to accommodate the value provided by the expanded physical clock. Thus, the value encroaches upon, at the very least, the processor identifier field of the basic time-of-day clock representation. Thus, the completion of the instruction is delayed until the processor identifier field reflects the correct processor identifier. As is known, the instruction is slowed down by having the microcode wait to issue an endop, which would then return control to the next instruction.

One example of the above is as follows:
   Upon execution of a STORE CLOCK instruction, a value of the physical clock is stored in the representation, but the value encroaches upon the processor identifier field such that the processor identifier field now has, for example, bits 0001 located therein. However, the proper processor identifier is 1001. Thus, execution of the instruction is delayed until the bits that encroach upon the processor identifier are the same as the processor identifier (e.g., 1001).

3. SMP Extensions: Previously, the processor identifier field (or PA, in this example) allowed for 16 unique processors in, for instance, an SMP environment. However, advances in technology, packaging and memory design allow for more than 16 processors to be packaged in an SMP frame. Maintaining the uniqueness requirement requires the PA field be extended. Thus, with the extended time-of-day clock, the processor identifier field (e.g., processor address) is increased from, for example, 4 to 8 bits, allowing for systems to contain up to 256 processors.

4. Parallel Sysplex Extensions: When uniprocessor systems evolved into multiprocessor systems, the architecture evolved as well, enabling applications to develop multitasking equivalents. The basic TOD-clock architecture and the rules defined above were part of that evolution. Now that parallel sysplex has been introduced, it is important to evolve the architecture to allow applications to develop parallel equivalents. For the TOD-clock architecture that would mean, ideally, to extend the architecture rules to the sysplex environment.

The inclusion of the TOD Programmable field in the last 16 bits of the extended TOD clock allows the operating system to provide a system identifier in the TOD programmable register that would be stored by the new STORE CLOCK EXTENDED instruction, and thus, extend the uniqueness of the TOD clock values to different systems in a Parallel Sysplex.

ETR continues to be used as a synchronizing mechanism for the separate physical TOD clocks. ETR is described in "Sysplex Timer Planning," IBM Publication No. GA23-0365-02, 1993, which is hereby incorporated herein by reference in its entirety.

Figure 11:
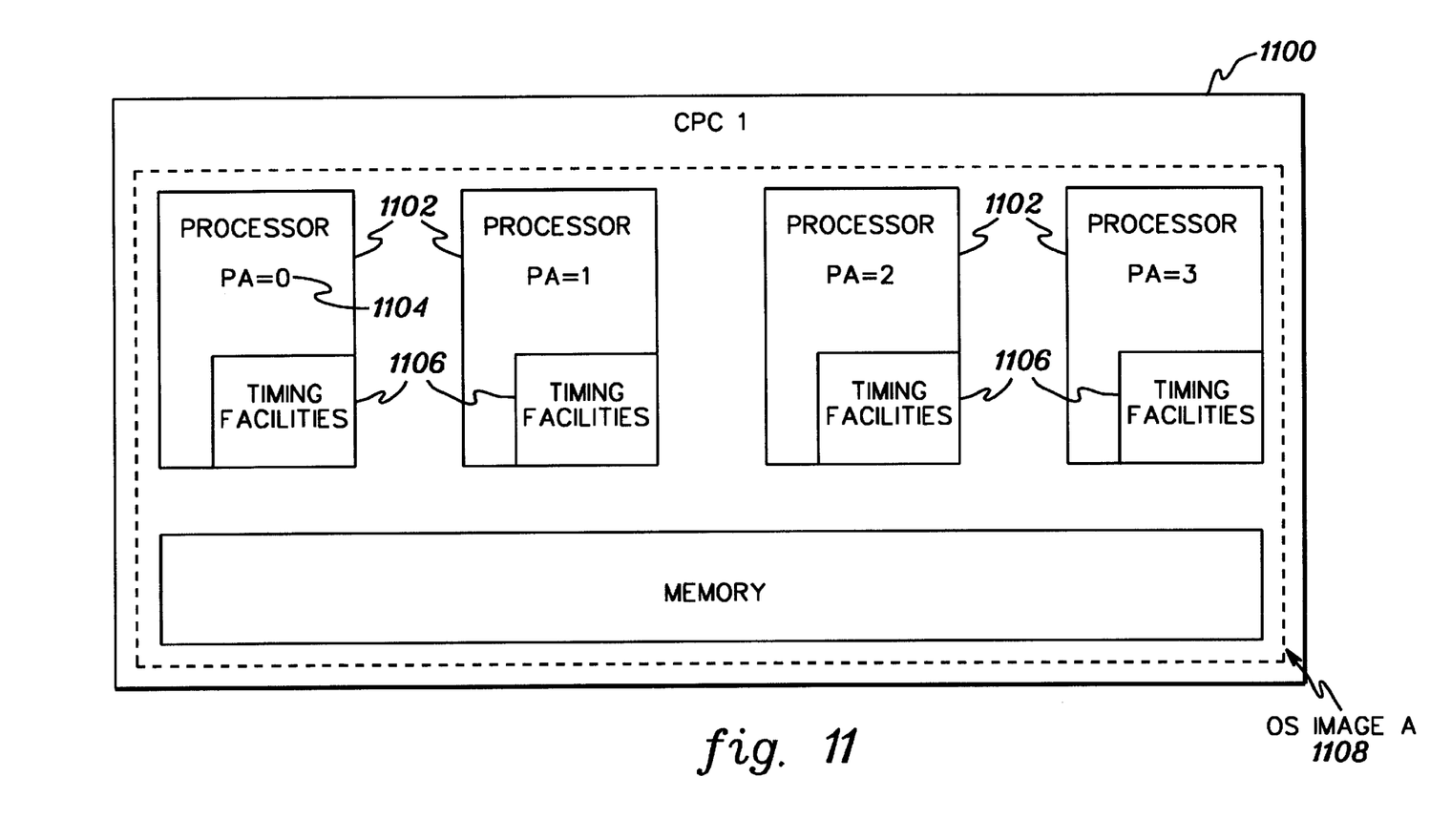
FIGS. 11–13 are further examples of computing environments incorporating and using the timing facilities of the present invention.

Further benefits of the present invention are explained with reference to FIGS. 11–13. FIG. 11 depicts one example of a central processing complex 1100 having four processors 1102 (i.e., central processing units) associated therewith. Each processor has its own processor identifier 1104 (e.g., processor address (PA)) and timing facilities 1106. The timing facilities in each processor are synchronized by hardware controls in the central processing complex.

This embodiment of a central processing complex is referred to as a 4 processor SMP. This 4 processor SMP has one copy of an operating system 1108 (i.e., Operating System Image A). That is, each of the four SMP processors shares the same operating system image. Unique values for the TOD clock are provided by the different processor identifier values, since there is only one operating system image.

Figure 12:
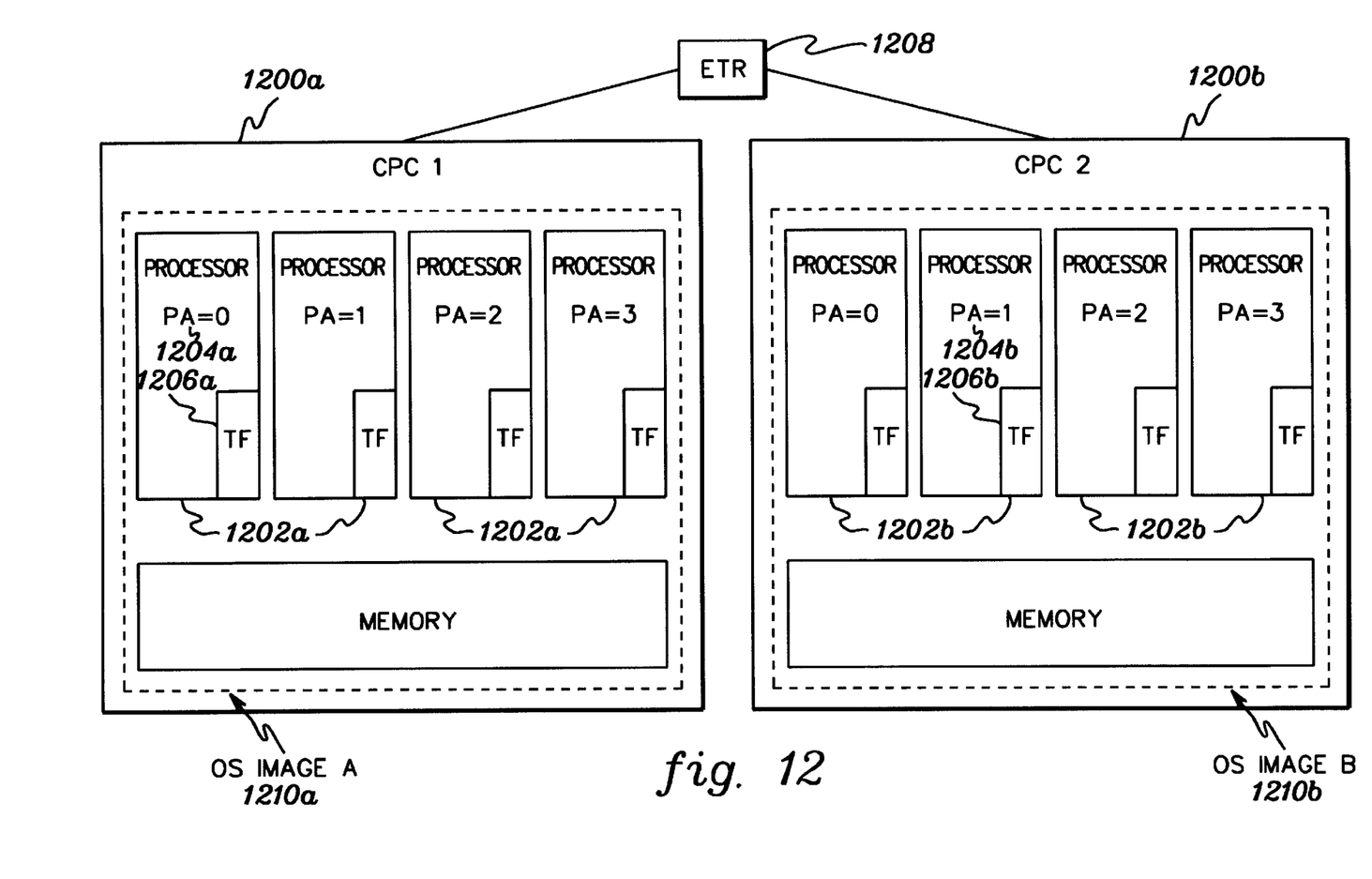

FIG. 12 depicts two separate central processing complexes 1200a, 1200b, each having for example, four processors 1202a, 1202b, respectively. Each processor 1202a has a processor address 1204a and timing facilities 1206a. Likewise, each processor 1202b has a processor address 1204b and timing facilities 1206b. The timing facilities are synchronized within the central processing complexes by hardware controls in each central processing complex, and the timing facilities are synchronized between the central processing complexes by ETR connections 1208.

In this example, each central processing complex has a single copy of an operating system image 1210a, 1210b, respectively. For instance, Central Processing Complex 1 has an Operating System Image A and Central Processing Complex 2 has an Operating System Image B. Unique values for the TOD clock are provided by the programmable field, which provides, for instance, an identifier associated with the operating system, as well as by the processor identifier field, which provides uniqueness within an operating system image.

Figure 13:
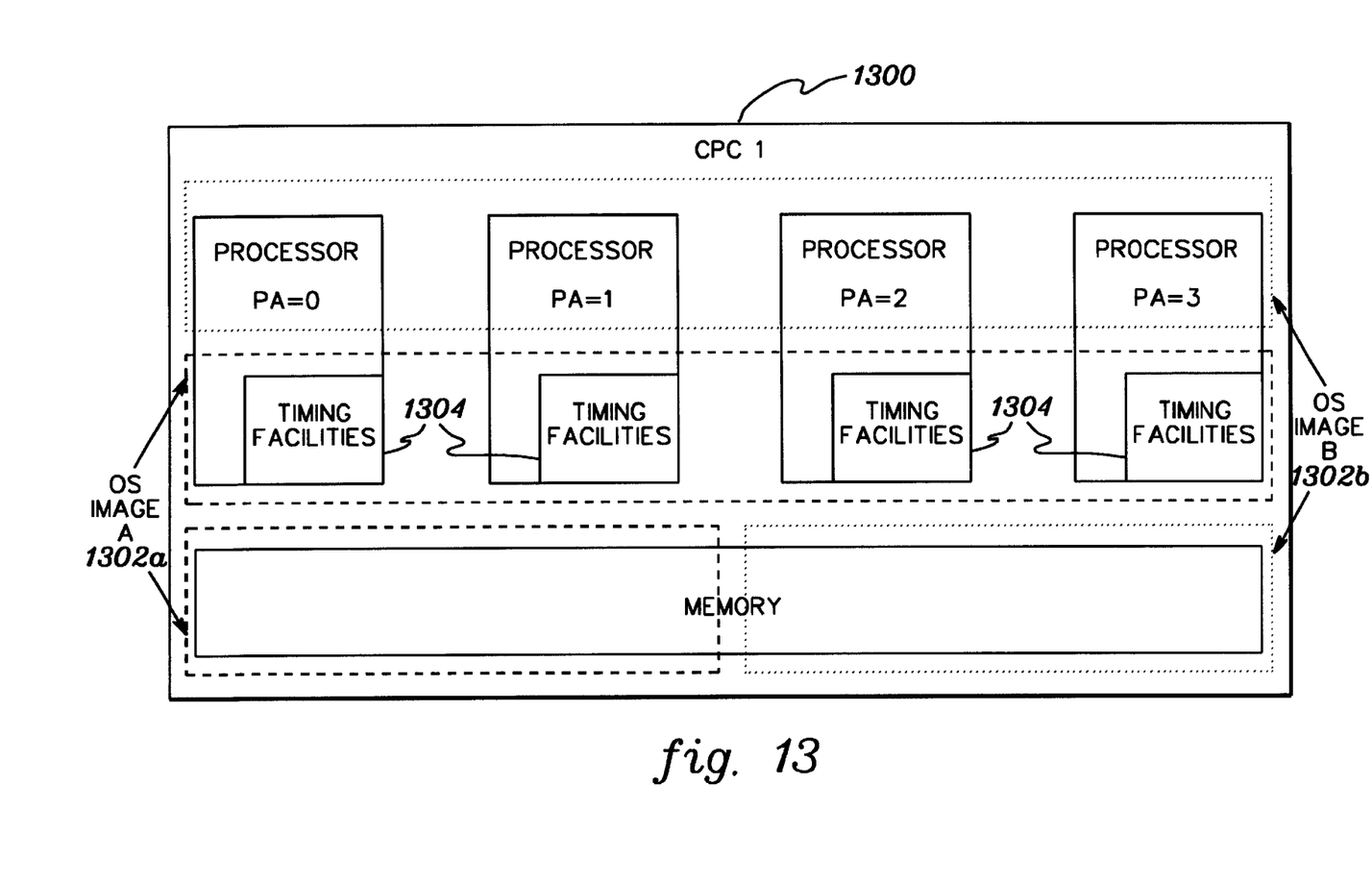

FIG. 13 depicts a single 4 processor SMP (CPC 1) 1300 that has been logically partitioned and is running two operating system images, Operating System Image A 1302a and Operating System Image B 1302b. The timing facilities 1304 are logically separated by an LPAR hiperviser and may be set to different values or coordinated depending on the configuration parameters. (LPAR is further described in "ES/9000 and ES/390 PR/SM Planning Guide," IBM Publication No. GA22-7123-13, March 1996, which is hereby incorporated herein by reference in its entirety. Uniqueness of the TOD values for STORE CLOCK instructions executed by separate tasks running on the same physical processor are not guaranteed by the processor identifier value, which will be the same. Thus, the time-of-day clock programmable field and the extended time-of-day clock representation are used to guarantee uniqueness.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of employing expanded physical clocks, said method comprising:

beginning execution of an instruction that places a value of a physical clock in a physical clock field of a clock representation, said physical clock field being unable to accommodate said value provided by said physical clock, wherein said value encroaches upon at least a portion of another predefined field of said clock representation; and delaying completion of said instruction, wherein said value is accommodated in said clock representation and a correct value is provided for said another predefined field.

2. The method of claim 1, wherein said instruction is a STORE CLOCK instruction.

3. The method of claim 1, wherein said delaying comprises delaying completion of said instruction until at least a portion of said value encroaching upon said another predefined field comprises a correct value for an encroached portion of said another predefined field.

4. The method of claim 1, further comprising expanding said physical clock, prior to beginning execution of said instruction, to provide enhanced precision of said physical clock.

5. The method of claim 4, wherein said physical clock comprises a clock register, and wherein said expanding comprises adding one or more additional bits to said clock register.

6. A method of employing enhanced physical clocks, said method comprising:

expanding a physical clock to provide enhanced precision of said physical clock; and delaying completion of an instruction that uses said physical clock to preserve behavior of said instruction even though said physical clock has expanded.

7. The method of claim 6, wherein said instruction uses said physical clock by placing a value of said physical clock in a physical clock field of a clock representation, said physical clock field being unable to accommodate said value, and wherein the behavior of said instruction is preserved by accommodating said value by allowing said value to encroach upon at least a portion of another predefined field of said clock representation and yet provide a correct value for said another predefined field.

8. A system of employing expanded physical clocks, said system comprising:

means for beginning execution of an instruction that places a value of a physical clock in a physical clock field of a clock representation, said physical clock field being unable to accommodate said value provided by said physical clock, wherein said value encroaches upon at least a portion of another predefined field of said clock representation; and means for delaying completion of said instruction, wherein said value is accommodated in said clock representation and a correct value is provided for said another predefined field.

9. The system of claim 8, wherein said instruction is a STORE CLOCK instruction.

10. The system of claim 8, wherein said means for delaying comprises means for delaying completion of said instruction until at least a portion of said value encroaching upon said another predefined field comprises a correct value for an encroached portion of said another predefined field.

11. The system of claim 8, further comprising means for expanding said physical clock, prior to beginning execution of said instruction, to provide enhanced precision of said physical clock.

12. The system of claim 11, wherein said physical clock comprises a clock register, and wherein said means for expanding comprises adding one or more additional bits to said clock register.

13. A system of employing enhanced physical clocks, said system comprising:

means for expanding a physical clock to provide enhanced precision of said physical clock; and means for delaying completion of an instruction that uses said physical clock to preserve behavior of said instruction even though said physical clock has expanded.

14. The system of claim 13, wherein said instruction uses said physical clock by placing a value of said physical clock in a physical clock field of a clock representation, said physical clock field being unable to accommodate said value, and wherein the behavior of said instruction is preserved by accommodating said value by allowing said value to encroach upon at least a portion of another predefined field of said clock representation and yet provide a correct value for said another predefined field.

15. A system of employing expanded physical clocks, said system comprising:

a processor adapted to begin execution of an instruction that places a value of a physical clock in a physical clock field of a clock representation, said physical clock field being unable to accommodate said value provided by said physical clock, wherein said value encroaches upon at least a portion of another predefined field of said clock representation; and said processor being further adapted to delay completion of said instruction, wherein said value is accommodated in said clock representation and a correct value is provided for said another predefined field.

16. An article of manufacture, comprising:

at least one computer usable medium having computer readable program code means embodied therein for causing the employing of expanded physical clocks, the computer readable program code means in said article of manufacture comprising:

computer readable program code means for causing a computer to begin execution of an instruction that places a value of a physical clock in a physical clock field of a clock representation, said physical clock field being unable to accommodate said value provided by said physical clock, wherein said value encroaches upon at least a portion of another redefined field of said clock representation; and computer readable program code means for causing a computer to delay completion of said instruction, wherein said value is accommodated in said clock representation and a correct value is provided for said another predefined field.

17. The article of manufacture claim 16, wherein said computer readable program code means for causing a computer to delay comprises computer readable program code means for causing a computer to delay completion of said instruction until at least a portion of said value encroaching upon said another predefined field comprises a correct value for an encroached portion of said another predefined field.

18. The article of manufacture claim 16, further comprising computer readable program code means for causing a computer to expand said physical clock, prior to beginning execution of said instruction, to provide enhanced precision of said physical clock.

19. At least one program storage device readable by a machine, tangibly embodying at least one program of instructions executable by the machine to perform a method of employing enhanced physical clocks, said method comprising:

expanding a physical clock to provide enhanced precision of said physical clock; and delaying completion of an instruction that uses said physical clock to preserve behavior of said instruction even though said physical clock has expanded.

20. The at least one program storage device of claim 19, wherein said instruction uses said physical clock by placing a value of said physical clock in a physical clock field of a clock representation, said physical clock field being unable to accommodate said value, and wherein the behavior of said instruction is preserved by accommodating said value by allowing said value to encroach upon at least a portion of another predefined field of said clock representation and yet provide a correct value for said another predefined field.

* * * * *